(12) United States Patent
Amde et al.

(10) Patent No.: US 9,565,294 B2
(45) Date of Patent: Feb. 7, 2017

(54) SYSTEMS, METHODS, AND APPARATUSES FOR OPTIMIZING DSL LINE CONFIGURATIONS AND PARAMETERS IN A DSL SYSTEM

(71) Applicant: Adaptive Spectrum and Signal Alignment, Inc., Redwood City, CA (US)

(72) Inventors: Manish Amde, Redwood City, CA (US); Wooyul Lee, Palo Alto, CA (US); Jeonghun Noh, Irvine, CA (US); Georgios Ginis, San Mateo, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 14/443,999

(22) PCT Filed: Nov. 19, 2012

(86) PCT No.: PCT/US2012/065890
§ 371 (c)(1),
(2) Date: May 19, 2015

(87) PCT Pub. No.: WO2014/077850
PCT Pub. Date: May 22, 2014

(65) Prior Publication Data
US 2015/0304488 A1 Oct. 22, 2015

(51) Int. Cl.
*H04M 1/24* (2006.01)
*H04M 3/08* (2006.01)
(Continued)

(52) U.S. Cl.
CPC ........ *H04M 3/2263* (2013.01); *H04L 41/0816* (2013.01); *H04M 3/2209* (2013.01); *H04M 3/2227* (2013.01); *H04M 11/062* (2013.01)

(58) Field of Classification Search
CPC ..... H04B 3/46; H04M 11/062; H04M 3/2209; H04M 3/2227; H04M 3/2223; H04M 3/304; H04M 3/306; H04L 1/0816; H04L 1/0856; H04L 5/006; H04L 5/14; H04L 3/0882; H04L 12/2856; H04L 12/2874
(Continued)

(56) References Cited

U.S. PATENT DOCUMENTS

| | | | | |
|---|---|---|---|---|
| 7,460,588 B2 * | 12/2008 | Rhee | ........................ | H04B 3/46 375/222 |
| 2006/0098725 A1 * | 5/2006 | Rhee | ........................ | H04B 3/48 375/222 |

(Continued)

*Primary Examiner* — Binh Tieu
(74) *Attorney, Agent, or Firm* — Green, Howard & Mughal, LLP

(57) ABSTRACT

In accordance with embodiments disclosed herein, there are provided apparatus, systems and methods for optimizing DSL line configurations and parameters in a DSL system. For example, such a system may include means for: interfacing to a currently operating Digital Subscriber Line ("DSL line") operating within a DSL system having a plurality of DSL lines operating therein; evaluating an active configuration of the currently operating DSL line by collecting operational data for the DSL line during operation of the DSL line; determining a plurality of candidate configurations for the currently operating DSL line, the plurality of candidate configurations being operationally compatible with the currently operating DSL line; selecting one of the sub-set of the plurality of candidate configurations as the selected configuration for the DSL line based on a preferred operational characteristic; and transitioning the currently operating DSL line from operating using the active configu-
(Continued)

ration for the DSL line to operating using the selected configuration for the DSL line. Other related embodiments are disclosed.

38 Claims, 6 Drawing Sheets

(51) Int. Cl.
*H04M 3/22* (2006.01)
*H04M 11/06* (2006.01)
*H04L 12/24* (2006.01)

(58) Field of Classification Search
USPC ............... 379/1.01, 1.03, 1.04, 9, 10.01, 12, 15.01,379/22, 22.02, 23, 27.01, 29.01, 29.09; 375/222
See application file for complete search history.

(56) References Cited

U.S. PATENT DOCUMENTS

| | | | |
|---|---|---|---|
| 2006/0198430 A1* | 9/2006 | Rhee | H04B 3/46 375/222 |
| 2006/0221849 A1* | 10/2006 | Wu | H04M 3/306 370/252 |
| 2009/0245336 A1* | 10/2009 | Blackburn | H04M 11/062 375/222 |

\* cited by examiner

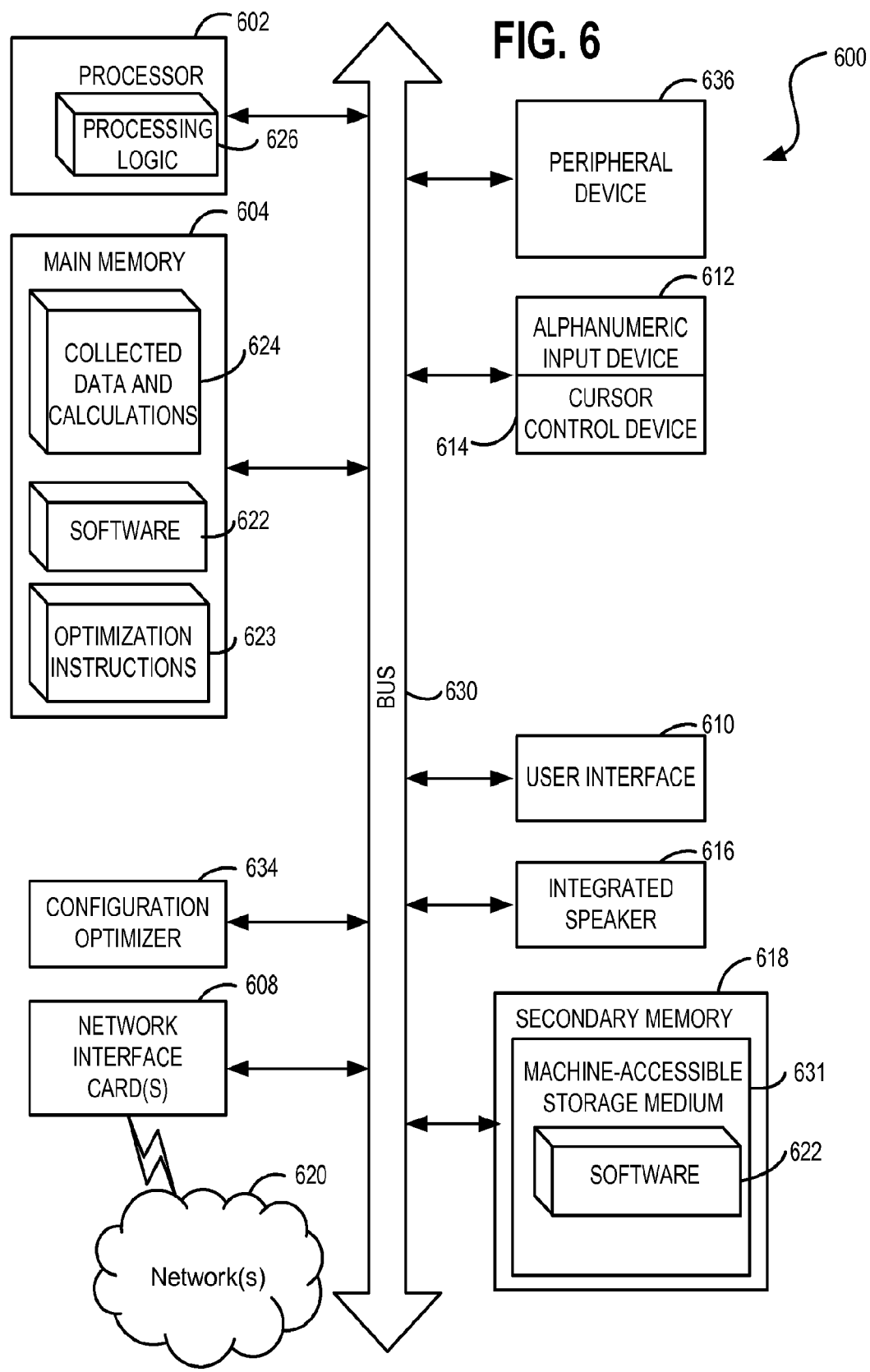

SYSTEMS, METHODS, AND APPARATUSES FOR OPTIMIZING DSL LINE CONFIGURATIONS AND PARAMETERS IN A DSL SYSTEM

CLAIM OF PRIORITY

This application is a U.S. National Phase application under U.S.C. §371 of International Application No. PCT/US2012/065890, filed Nov. 19, 2012, entitled "SYSTEMS, METHODS, AND APPARATUSES FOR OPTIMIZING DSL LINE CONFIGURATIONS AND PARAMETERS IN A DSL SYSTEM", the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, methods, and apparatuses for optimizing DSL line configurations and parameters in a DSL system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Digital Subscriber Line (DSL) technologies provide potentially large bandwidth for digital communication over existing twisted-pair telephone lines to subscriber locations, such as businesses, residences, etc. These twisted-pair telephone lines are sometimes referred to as loops, DSL lines, or the "copper plant."

Despite their original design for only voice-band analog communication, these twisted-pair telephone lines are nevertheless capable of providing bandwidth in-line with expectations of modern Internet users, when the lines are configured and managed appropriately.

Generally speaking, a default or template DSL line configuration is applied to a DSL line and that configuration then controls the operation of the DSL line in perpetuity. Using conventional DSL implementations, the DSL configuration is only modified on an as-needed basis, for instance, by a service technician responding to a service call from a customer due to poor performance of the DSL line. Such a strategy is inefficient in terms of human resources as the technician must manually review and modify the configuration, and such a conventional strategy also fails to fully utilize the operational potential of a DSL line which may yield greater customer satisfaction for DSL subscribers and in turn yield improved profit potential for DSL service providers and DSL operators.

The present state of the art may therefore benefit from systems, methods, and apparatuses for optimizing DSL line configurations and parameters in a DSL system as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6 illustrates a diagrammatic representation of a machine in the exemplary form of a computer system, in accordance with one embodiment.

DETAILED DESCRIPTION

Figure 1:
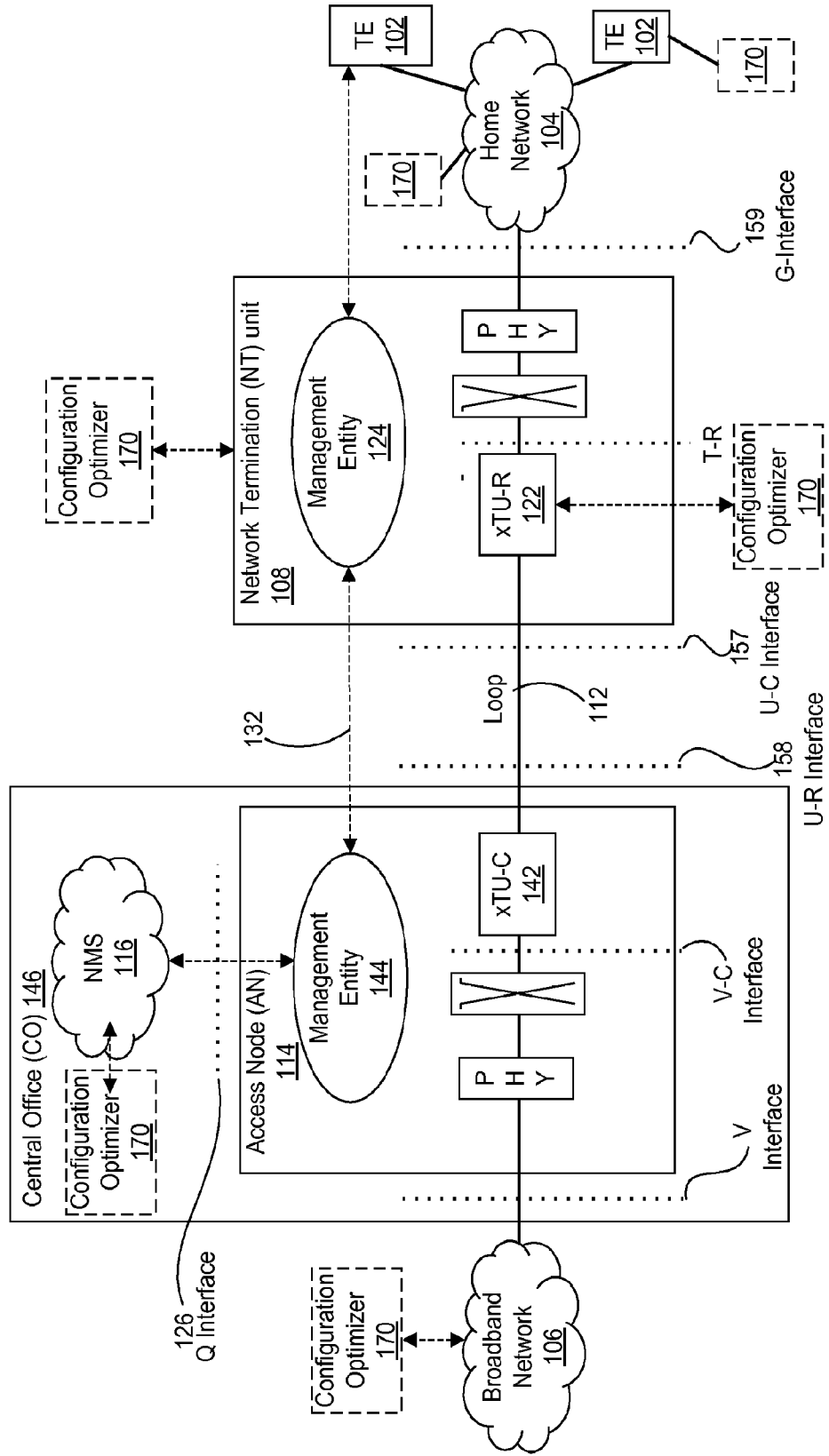
FIG. 1 illustrates an exemplary architecture in which embodiments may operate.

Described herein are apparatus, systems and methods for optimizing DSL line configurations and parameters in a DSL system. In accordance with one embodiment, an exemplary system may include means for: interfacing to a currently operating Digital Subscriber Line ("DSL line") operating within a DSL system having a plurality of DSL lines operating therein; evaluating an active configuration of the currently operating DSL line by collecting operational data for the DSL line during operation of the DSL line; determining a plurality of candidate configurations for the currently operating DSL line, the plurality of candidate configurations being operationally compatible with the currently operating DSL line; selecting one of the sub-set of the plurality of candidate configurations as the selected configuration for the DSL line based on a preferred operational characteristic; and transitioning the currently operating DSL line from operating using the active configuration for the DSL line to operating using the selected configuration for the DSL line.

There are a variety of "configurations" which may be applicable to DSL lines undergoing configuration optimization. For instance, a configuration may correspond to new configuration settings or parameters for an existing configuration, changed or updated configuration settings or parameters for an existing configuration, candidate configurations which wholly replace an existing active configuration for a DSL line, or various DSL line profiles which may also be used to replace an active configuration for a DSL line. One example of a DSL "line profile" specifies parameters such as data rate, Power Spectral Density (PSD), margin, Forward Error Correction (FEC) parameters, Carrier Mask (CMASK), system types, etc. Other such configurations or profiles which affect the operational conditions of a DSL line may also be utilized in the context of the configuration optimization algorithms, methods, techniques, apparatus, and systems which are described herein.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+ (G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

In performing the disclosed functions, systems may utilize a variety of operational data (which includes performance data) that is available at an Access Node (AN).

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each TU-R 122 in a system may be coupled with a TU-C (TU Central) in a Central Office (CO) 146 or other central location. TU-C 142 is located at an Access Node (AN) 114 in Central Office 146. A Management Entity (ME) 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112, which in the case of ADSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the Operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). U-C interface 157 provides TU-C near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs.

Depicted within FIG. 1 is apparatus 170 operating as a configuration optimizer at various optional locations in accordance with several alternative embodiments. For example, in accordance with one embodiment, apparatus 170 is located within home network 104, such as within a LAN in which the configuration optimizer 170 may optionally be connected with terminal equipment (TE) 102 or directly to the LAN, for instance, via a router, etc. In one embodiment apparatus 170 operates as circuitry within a DSL modem, such as a Customer Premises Equipment (CPE) modem. In another embodiment, apparatus 170 operates as a controller card or as a chipset within a user's terminal equipment 102 (e.g., a Customer Premises Equipment (CPE) device or a remote terminal device, network node, LAN device, etc.) coupled to the home network 104 as depicted. In another embodiment, apparatus 170 operates as a separate and physically distinct stand alone unit which is connected between the user's terminal equipment 102 and a DSL line or loop, sometimes referred to as a signal conditioning device. In one embodiment, apparatus 170 operates within an Access Point (AP), within a Wireless Access Point (WAP), or within a router (e.g., a WiFi router or other wireless technology router). In other embodiments, configuration optimizer 170 operates in a location physically remote from the DSL subscriber's business or residence, for instance, the configuration optimizer 170 may interface to NMS 116 at a Central Office 146, interface to broadband network 106, for instance, by operating within the cloud at a third party entity distinct from the DSL service subscriber and the DSL service provider or DSL operator, in which the configuration optimizer 170 interfaces as necessary to the DSL line undergoing configuration optimization over the public Internet or other broadband network 106. The configuration optimizer 170 may interface to NT unit 108 or to the receive side modem at xTU-R 122, etc. In yet another embodiment, configuration optimizer 170 is connected with a NT unit 108 or with xTU-R 122 over the G-interface 159.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For example, Public Switched Telephone Network (PSTN) used to provide DSL services to customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed/Very high-bit-rate DSL (VDSL). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.ads12) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for Vectored systems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it shall be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2:
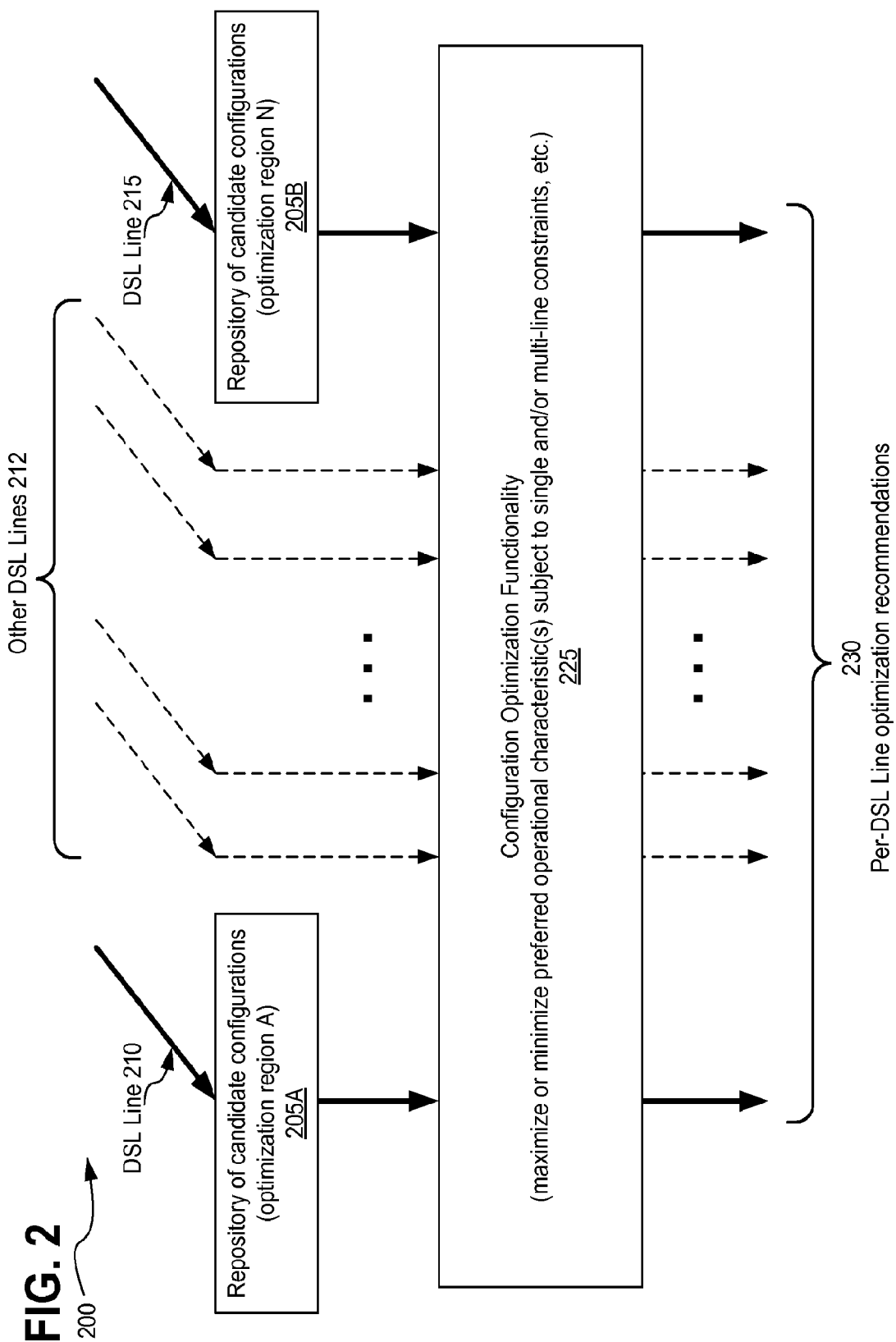
FIG. 2 illustrates an alternative exemplary architecture in which embodiments may operate.

FIG. 2 illustrates an alternative exemplary architecture 200 in which embodiments may operate. Specifically depicted are multiple DSL lines to be subjected to optimization, including DSL line 210 within optimization region A, DSL line 215 within optimization region N, and other exemplary DSL lines 212 which may be in any number of other optimization regions.

According to the depicted embodiment, DSL line 210 is referenced against a repository of candidate configurations for optimization region A at element 205A and DSL line 215 is referenced against another repository of candidate configurations for optimization region N at element 205B. In this example, there are multiple repositories which correspond to various optimization regions, such that DSL lines may be optimized in view of a set of configurations within the entire optimization space. Such an optimization space may be characterized as the entire set of configurations which are eligible for consideration during optimization. The resulting list of candidate configurations (e.g., refer to FIG. 3 at elements 315A and 315B) or the respective optimization regions thus represents a subset of configurations that may be used for the optimization of the DSL line corresponding to or associated with that optimization region. Where multiple such candidate repositories are available corresponding to distinct optimization regions, as depicted, then a determination may be made as to which of the several repositories is to be referenced. For instance, the repository to be referenced may be determined based upon the service product, DSLAM, and CPE of associated with the DSL line undergoing configuration optimization.

The DSL lines 210, 212, 215 undergoing configuration optimization are then subjected to the configuration optimization functionality 225, for instance, to maximize or minimize a preferred operational characteristic subject to single and/or multi-line constraints for the respective DSL line 210, 212, 215. Within the configuration optimization functionality 225, the available candidate configurations from the repositories 205A-B may be filtered appropriately to eliminate any configuration which fails to comply with minimum operational requirements for the respective DSL line 210, 212, 215, thus yielding a sub-set from the repository of candidate configurations for the respective DSL line 210, 212, 215. That is to say, the repository of candidate configurations 205A-B will be evaluated for the given DSL line 210, 212, 215, and many may be eliminated from further consideration, while others meeting the minimum operational requirements will be retained for further consideration, thus establishing the sub-set. In other instances, certain configurations may be eligible for further consideration only when a second configuration for a second line is also retained within the surviving sub-set of candidate configurations. For example, it may be that configuration "A" for DSL line 1 will only work if configuration "B" is utilized on DSL line 2. Thus, either both "A" and "B" configurations must be retained if either is to be used Elimination of "B," for example, would affirmatively require the elimination of "A." During a subsequent selecting phase, this constraint could then again be applied as a sub-rule or other multi-line constraint for DSL lines 1 and 2 respectively.

Because more than one candidate configuration will remain, a selecting operation is then instituted by the configuration optimization functionality 225 to narrow the sub-set of candidate configurations to only one for the respective DSL line 210, 212, 215.

Thus, the configuration optimization functionality 225 outputs per-DSL line optimization recommendations at element 230, according to the exemplary embodiment. For instance, the configuration optimization functionality 225 may seek to find the best possible candidate configuration from the surviving sub-set of configurations provided by the repository for the individual DSL line undergoing the optimization process via the configuration optimization functionality 225. What configuration is "best" however, may vary, and thus, the selecting means is further capable to choose or select one surviving candidate configuration based on a preferred operational characteristic associated with the respective DSL line 210, 212, 215.

Other considerations are contemplated to yield the per-DSL line optimization recommendations at element 230 in accordance with the various embodiments. For instance, given a list of available candidate configurations or parameter optimizations for such configurations, the configuration optimization functionality 225 may seek to maximize or minimize various operational characteristics for any given line. For instance, it may be desirable to maximize data rate as the preferred operational characteristic for one line, such as DSL line 210, and separately minimize latency for another line, such as DSL line 215. While such operational characteristics may not necessarily be exclusive, one can be given heightened preference over the other.

Other considerations include subjecting the optimization of a given DSL line to single-line constraints or multi-line (e.g., joint) constraints, as necessary.

Single-line constraints may include adherence to estimated and/or reported performance counters (e.g., Coding Violations (CV), Re-inits, etc.), as well as estimated and/or reported operational data (rates, latency, margin, power, etc.) and derived data from both performance counters and operational data (line stability, high-layer throughput) for any candidate configuration to survive the elimination phase.

Multi-line constraints may include any of a number of requirements which take into consideration more than one DSL line. For instance, such multi-line requirements may (a) require a utility function be applied to maximize the weighted sum of rates for all DSL lines in a common binder; (b) require that bonded lines be constrained such that their respective configurations utilize the same delay; (c) require that vectored lines be constrained such that their respective configurations operate above a threshold power level; (d) require that single independent lines within a binder be constrained such the configuration for such single lines maintain a data rate which does not fall below a certain pre-configured or dynamically calculated threshold; (e) require that bonded lines be constrained such that the rate ratio between two lines does not exceed a certain pre-configured value, and so forth. Thus, rather than seeking only to maximize an operational characteristic for a specific DSL line, that operational characteristic (e.g., rate, latency, etc.) may be compromised or overridden to an extent such that the above exemplary multi-line constraints are complied with. Such multi-line constraints may be instituted to ensure efficient operation of the DSL lines undergoing configuration optimization. For example, crosstalk from non-vectored DSL lines onto vectored DSL lines may be required to exhibit levels below pre-configured or dynamically calculated thresholds. For bonded DSL lines, multi-line constraints may include a requirement that the sum of the rates for a bonded pair be greater than the rate currently established. For instance, it is feasible that one of two lines within a bonded DSL line could be increased by a new profile while the other DSL line is degraded, thus resulting in a net decrease for the bonded DSL line. Thus, multi-line constraints require consideration of both single DSL line elements making up the bonded DSL line such that gains on one line do not result in a total net loss for the bonded DSL line which operates as a single unit for the given DSL subscriber. Other bonded line requirements exist, such as requiring that configuration candidates for bonded DSL lines have the same delay on each of the respective pairs making up the bonded DSL line.

Other pre-configured or dynamically calculated thresholds may also be specified. For instance, the configuration optimization functionality 225 may dictate an objective requirement that any candidate configuration must maximize the MABR (e.g., Maximum Attainable Bit Rate), for the DSL line being optimized.

There are other considerations which may be utilized in both an elimination phase and selecting phase which are not directly tied to operational characteristics, but reflect an aspect of business operational efficiency. For instance, probabilities may be calculated to determine the likelihood of a service call, service dispatch, or service churn from the estimated operational characteristics resulting from profile changes, all of which generate operational costs for the DSL provider or DSL operator, and as such, the configuration optimization functionality 225 may calculate such probabilities for candidate configurations and then eliminate or select profiles which aim to reduce those business operational costs based on the computed probabilities. The calculated probabilities representing the likelihood of a service call, service dispatch, or service churn are a function of operational characteristics (e.g., rates, CV, re-inits, etc.) which may be estimated for any of the candidate configurations.

These and other details as well as numerous alternative embodiments are described in further detail below with regard to the Figures that follow.

Figure 3:
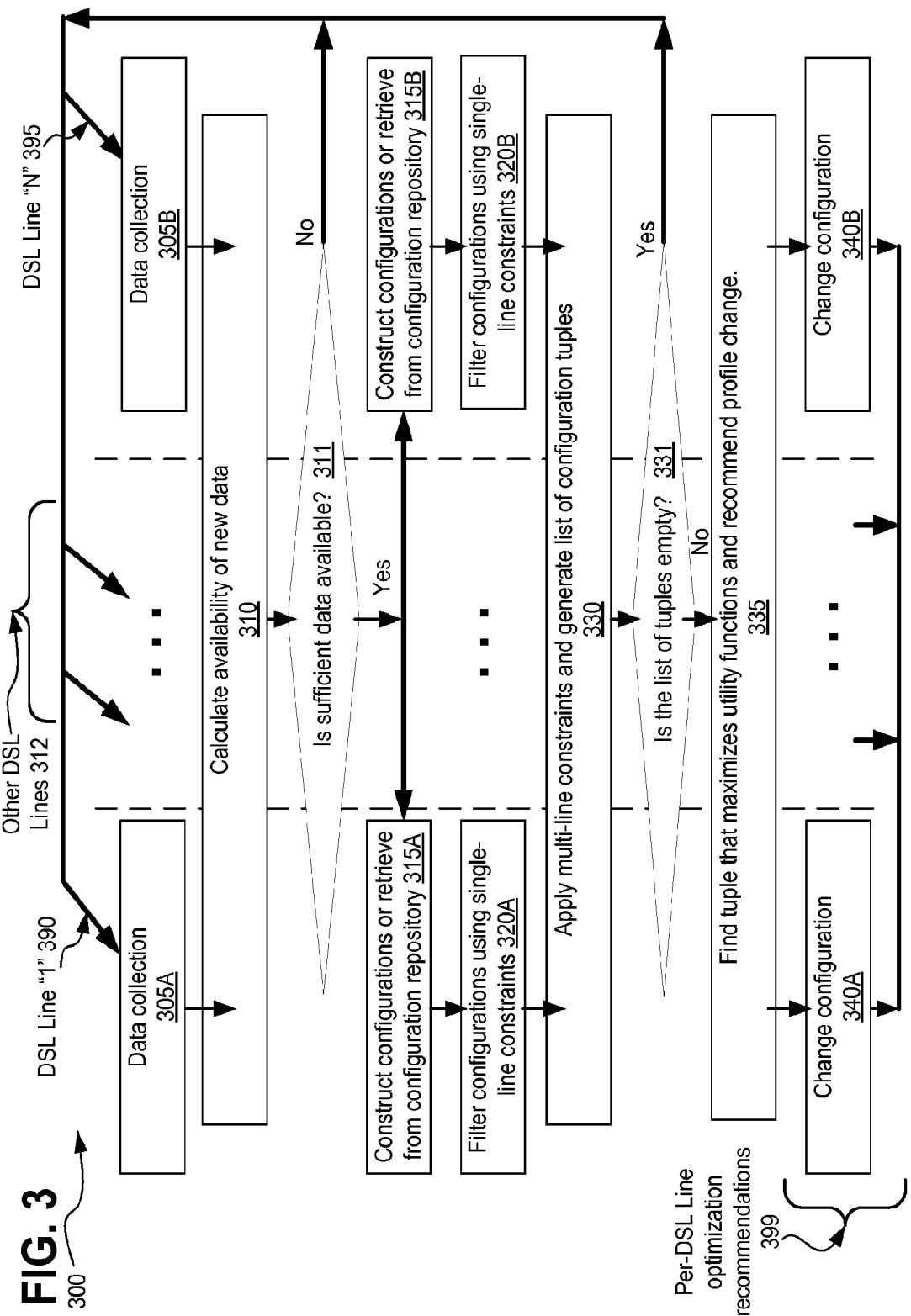
FIG. 3 illustrates another alternative exemplary architecture in which embodiments may operate.

FIG. 3 illustrates another alternative exemplary architecture 300 in which embodiments may operate. In this exemplary embodiment, there are DSL lines 390 and 395 respectively. Other DSL lines 312 may also be present which may or may not undergo configuration optimization with the other respective DSL lines 390, 395.

According to the described embodiments, configuration optimization may be thought of as a multi-line optimization system consisting of single lines, bonded line pairs and multiple vectored lines, in which the single-line optimization is a degenerate case of multi-line optimization. Additionally, single-line optimization may be subjected to multi-line constraints, such as requiring that one of the two individual lines within a bonded pair have to respect same delay equipment constraints as second bonded line which may not be undergoing configuration optimization. According to the exemplary embodiment set forth by FIG. 3, configuration optimization proceeds as follows: Beginning with blocks 305A and 305B, data collection for each of the respective DSL lines (DSL line 1 at element 390 and DSL line N at element 395) is performed independently or jointly. At block 310, functionality calculates the availability of new data and at decision point 311 it is determined whether sufficient data is available. If "no," sufficient data is not available at decision point 311, then flow returns to the beginning, for example, to the data collection phase at blocks 305A-B to accumulate more operational data for the respective DSL lines 390, 395.

Alternatively, if "yes," sufficient data is available at decision point 311, then flow advances to blocks 315A and 315B where a list of candidate configurations is constructed or the candidate configurations are retrieved from a repository for each of the respective DSL lines 390, 395 either independently or jointly.

Flow then advances to blocks 320A and 320B where single-line constraints are applied to each of the respective DSL lines 390 and 395 either independently or jointly to obtain a subset of configurations for each of the respective DSL lines 390 and 395 satisfying the single-line constraints required according to the filtering of the configurations using the single-line constraints as denoted by blocks 320A-B.

Flow then advances to block 330 where functionality applies multi-line constraints and generates or constructs a list of configuration tuples. For example, in a two line system, such as with a bonded DSL line having a pair of single DSL lines, if a first line (e.g., DSL line 390) has three candidate configurations and a second line (e.g., DSL line 395) has four candidate configurations, then a total of twelve (3×4=12) possible configuration tuples could be created. Thus, multi-line constraints are applied to the configuration tuples to obtain a subset of tuples as candidate configurations. The multi-line constraints may be from lines that are not even under optimization, for instance, in this example, lines 390 and 395 may be undergoing configuration optimization where as the other DSL lines 312 are not, yet the multi-line constraints may nevertheless take into account the needs or constraints of the other DSL lines 312.

At decision point 331 it is determined whether the list of tuples is empty. If "yes," the list of tuples is empty, then flow simply returns to the beginning such that additional data may be collected for the respective DSL lines 390, 395 at blocks 305A-B. Alternatively, if "no," the list of tuples is not empty, then flow advances to block 335, where finally the tuple with the best predicted preferred operational characteristic is chosen, thus resulting in the per-DSL line optimization recommendations 399 and triggering functionality at blocks 340A and 340B in which configuration change requests are sent jointly or independently for the respective DSL lines 390, 395.

The flow beginning at functional blocks 305A and 305B may then be repeated for the same respective DSL lines 390, 395 or for other DSL lines 312.

Through practice of the described embodiments, parameters or settings for candidate configurations need not be prioritized or ranked in advance, as is the conventional practice. Instead, a configuration optimizer (e.g., element 170 from FIG. 1) may identify the most appropriate configuration based upon scores or other objective methods after filtering the various available configurations in light of the known constraints. For example, if the objective is to maximize the achievable rate by selecting different VDSL band plans, a VDSL 8B band plan may yield a higher rate for a long loop whereas a VDSL 17A band plan may yield a higher rate in a short loop. The optimal selection can't be achieved with a pre-determined priority or other rankings as has been done in the past.

Further still, DSL lines can be optimized jointly by building objective functions that encompass the performance of multiple lines, for instance where a bonded line or vectored line is the subject of optimization or for a single DSL line is being optimized in an operational environment which could have detrimental effects on other DSL lines in the DSL system due to increased crosstalk, noise, etc. from the single DSL line undergoing configuration optimization.

Weighted sum-rate maximization with delay constraints for bonded pair is one example of joint optimization, in which both individual twisted pair telephone lines making up a bonded pair must be configured such that their delay, whatever it may be, is coordinated such that it remains consistent between both transmission elements of the bonded pair.

Figure 4:
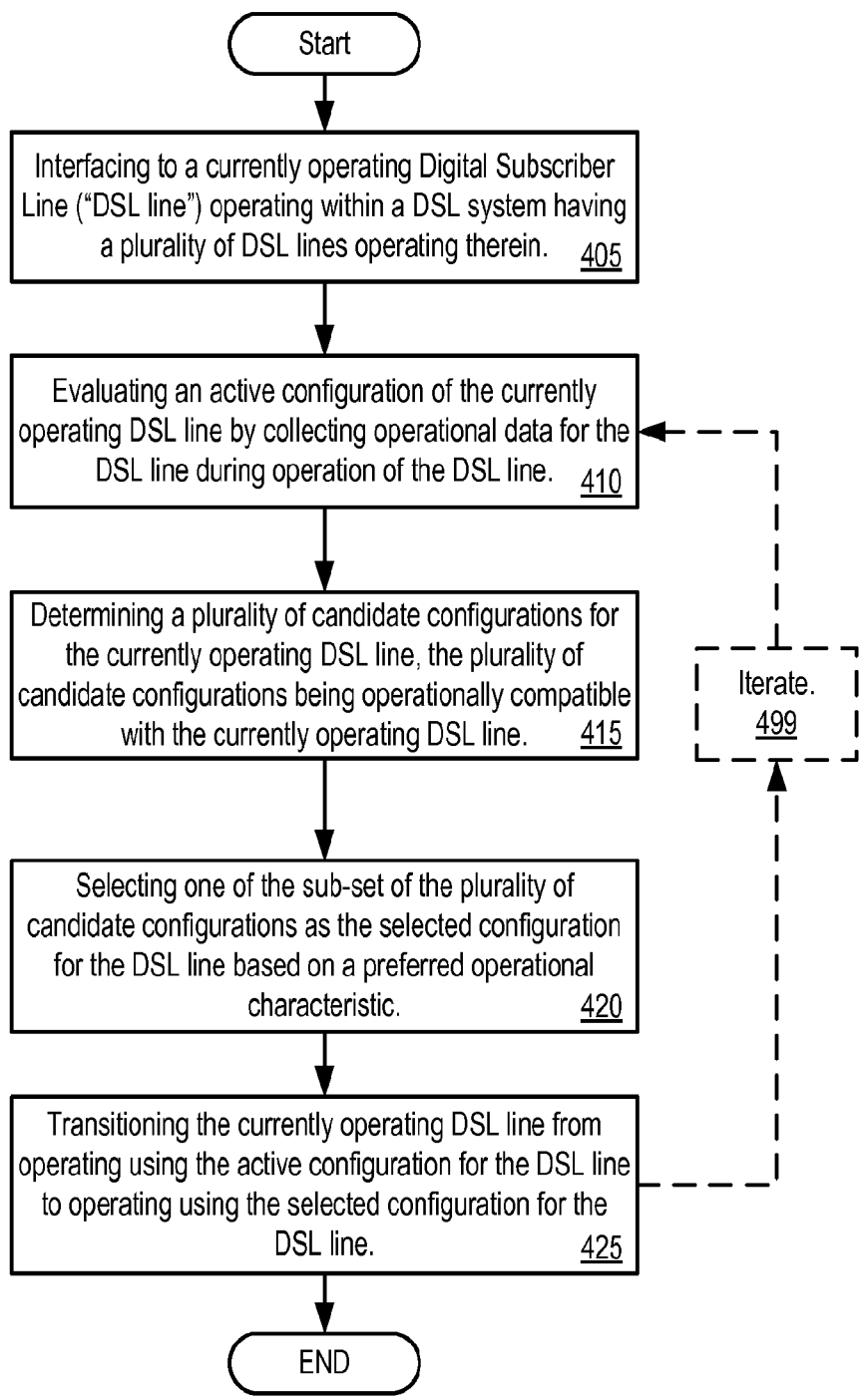
FIG. 4 is a flow diagram illustrating a method for optimizing DSL line configurations and parameters in a DSL system in accordance with described embodiments.

FIG. 4 is a flow diagram illustrating a method 400 for optimizing DSL line configurations and parameters in a DSL system in accordance with described embodiments. Method 400 may be performed by processing logic that may include hardware (e.g., circuitry, dedicated logic, programmable logic, microcode, etc.), software (e.g., instructions run on a processing device to perform various operations such as interfacing, evaluating, determining, selecting, transitioning, etc., or some combination thereof). In one embodiment, method 400 is performed or coordinated via an apparatus such as that depicted at element 170 of FIG. 1 or the configuration optimizer 501 at FIG. 5. Some of the blocks and/or operations listed below are optional in accordance with certain embodiments. The numbering of the blocks presented is for the sake of clarity and is not intended to prescribe an order of operations in which the various blocks must occur.

Method 400 begins at block 405 with processing logic for interfacing to a currently operating Digital Subscriber Line ("DSL line") operating within a DSL system having a plurality of DSL lines operating therein.

At block 410, processing logic evaluates an active configuration of the currently operating DSL line by collecting operational data for the DSL line during operation of the DSL line.

At block 415, processing logic determines a plurality of candidate configurations for the currently operating DSL line, in which the plurality of candidate configurations are operationally compatible with the currently operating DSL line.

At block 420, processing logic selects one of the sub-set of the plurality of candidate configurations as the selected configuration for the DSL line based on a preferred operational characteristic.

At block 425, processing logic transitions the currently operating DSL line from operating using the active configuration for the DSL line to operating using the selected configuration for the DSL line.

From block 425, processing may iterate through block 499 as necessary by returning to block 410 where the newly transitioned configuration is then subjected to evaluation by collecting operational data for the DSL line on the newly transitioned configuration, followed by the determining, eliminating, selecting, and transitioning operations of blocks 410 through 425, or flow may simply end, thus terminating and exiting the optimization process.

According to another embodiment, the method further includes evaluating the DSL line operating using the selected configuration; and repeating the determining, selecting, and transitioning.

According to another embodiment of the method, selecting one of the sub-set of the plurality of candidate configurations as the selected configuration for the DSL line based on a preferred operational characteristic, includes: (i) for each of the plurality of candidate configurations, establishing an expected utility metric of the currently operating DSL line if transitioned to operation on the respective candidate configuration; and (ii) selecting the one of the sub-set of the plurality of candidate configurations, in which the selecting is based on which of the plurality of candidate configurations corresponds to the expected utility metric having the highest value among all of the sub-set of the plurality of candidate configurations.

According to another embodiment of the method, the active configuration of the currently operating DSL line is included as one of the plurality of candidate configurations. According to such an embodiment, selecting one of the sub-set of the plurality of candidate configurations as the selected configuration for the DSL line based on a preferred operational characteristic, includes: (i) for each of the plurality of candidate configurations, establishing an expected utility metric of the currently operating DSL line if transitioned to operation on the respective candidate configuration, in which the expected utility metric is based on the operational date collected for the DSL line during operation of the DSL line and based further on historical operational data previously collected and stored reflecting past operational characteristics of the DSL line, and (ii) selecting the one of the sub-set of the plurality of candidate configurations, in which the selecting is based on which of the plurality of candidate configurations corresponds to the expected utility metric having the highest value among all of the sub-set of the plurality of candidate configurations.

According to another embodiment, the method further includes: eliminating one or more of the plurality of candidate configurations due to minimum operational requirements for the currently operating DSL line to yield a sub-set of the plurality of candidate configurations for the DSL line.

According to another embodiment, the method further includes: eliminating one or more of the plurality of candidate configurations by: (i) retrieving user provided configuration constraints; (ii) establishing an expected utility metric of the currently operating DSL line if transitioned to operation on a first one of the plurality of candidate configurations; (iii) comparing the expected utility metric to the user provided configuration constraints; (iv) eliminating the first one of the plurality of candidate configurations when the expected utility metric indicates the user provided configuration constraints will not be achieved if the currently operating DSL line is transitioned to the first one of the plurality of candidate configurations; and (v) iterating through each of the remaining plurality of candidate configurations by repeating operations (ii) through (iv).

For example, the user provided configuration constraints retrieved may include input captured at service products accessible to the consumer, for instance, via a configurations interface of a modem, router, or other such device, or the retrieved user provided configuration constraints may include end user specified preferences such as those from a gamer which may request the lowest possible latency over other operational characteristics such as rate, or from a business entity which may specify line stability over other possible operational characteristics, etc. These preferences are only examples of the types of user provided configuration constraints that may be specified and then consumed by the optimization algorithm.

According to another embodiment of the method, determining the plurality of candidate configurations for the currently operating DSL line, includes: interfacing to a Digital Subscriber Line Access Multiplexer (DSLAM) communicatively interfaced with the currently operating DSL line; reading available candidate configurations for the currently operating DSL line from the DSLAM; and including the available candidate configurations read from the DSLAM with the plurality of candidate configurations determined for the currently operating DSL line.

For example, DSLAMs in certain DSL implementations may be pre-configured with candidate configurations (e.g., available DSL line profiles, parameters, settings, etc.) already loaded on them for use within the DSL system. This type of repository is only one of many potential sources. Other sources for candidate configurations may co-exist or alternatively exist, such as dynamic generation of candidate configurations, or retrieving such candidate configurations from other sources, such as a cloud based third party optimization services provider distinct from the DSL operator responsible for the DSL system's equipment and distinct also from the DSL services provider which provides the DSL subscription services to end users, such as residences and businesses. For instance, such a third party cloud based service provider may provide optimization services and candidate configurations directly to end-users to improve DSL modem operation, or to the DSL services provider and/or DSL operator.

According to another embodiment of the method, determining the plurality of candidate configurations for the currently operating DSL line, includes: retrieving successful configurations for one or more other DSL lines operating within the DSL system not including the currently operating DSL line, in which the successful configurations have been identified as a selected configuration for at least one of the one or more other DSL lines in the DSL system and further in which the one or more other DSL lines in the DSL system have been transitioned to a respective one of the successful configurations; and including the successful configurations with the plurality of candidate configurations determined for the currently operating DSL line.

According to another embodiment of the method, determining the plurality of candidate configurations for the currently operating DSL line, includes: generating multiple copies of the active configuration for the currently operating DSL line or multiple copies of a default configuration, or both; modifying at least one configuration setting within each of the multiple copies to yield multiple unique variations of the active configuration or the default configuration, or both, each of the multiple unique variations being distinct from one another, distinct from the active configuration, and distinct from the default configuration; and including the multiple unique variations with the plurality of candidate configurations determined for the currently operating DSL line.

Creation of candidate configurations may be performed using a combination of one or more techniques, including: (a) Manual design by an expert; (b) dynamic generation of candidate profiles using the current profile of the line, in which historical profiles are applied to the DSL line and/or current and historical profiles applied to neighborhood lines; (c) collaborative filtering or nearest N-neighbor algorithm, in which such an algorithm seeks out successful configuration transitions for "similar" DSL lines within the DSL network; or (d) utilizing candidate configurations already loaded on the DSLAM as noted above.

According to another embodiment of the method, the plurality of candidate configurations being operationally compatible with the currently operating DSL line, includes: (i) each of the plurality of candidate configurations being capable of activation for the currently operating DSL line by transitioning a DSL modem for the currently operating DSL line to the respective candidate configuration; (ii) each of the plurality of candidate configurations having a plurality of configuration settings being wholly supported by the DSL modem for the currently operating DSL line; (iii) each of the plurality of candidate configurations having configuration settings therein, each of the configuration settings being within acceptable ranges or limits as specified by a DSL service provider; and (iv) each of the plurality of candidate configurations being compatible with bonded DSL line requirements when the currently operating DSL line is a bonded DSL line and further being compatible with vectored DSL line requirements when the currently operating DSL line is a vectored DSL line.

According to another embodiment of the method, the currently operating DSL line includes one of: a single twisted-pair telephone line carrying DSL signals of the currently operating DSL line to a single DSL service subscriber; a bonded DSL line having two or more single twisted-pair telephone lines therein jointly carrying the DSL signals of the currently operating DSL line to the single DSL service subscriber; and a vectored DSL line being one of a plurality vectored DSL lines within a vectored group of DSL lines jointly managed for noise cancellation among each of the plurality vectored DSL lines within the vectored group of DSL lines, the vectored DSL line carrying the DSL signals of the currently operating DSL line to the single DSL service subscriber and the remaining ones of the plurality vectored DSL lines within the vectored group of DSL lines carrying other DSL signals to other DSL service subscribers.

According to another embodiment of the method, the DSL system having the plurality of DSL lines operating therein including the currently operating DSL line, includes single-line constrained DSL lines, multi-line constrained bonded DSL lines, and multi-line constrained vectored DSL lines; in which selecting one of the sub-set of the plurality of candidate configurations as the selected configuration for the DSL line based on the preferred operational characteristic includes jointly optimizing the single-line constrained DSL lines, the multi-line constrained bonded DSL lines, and the multi-line constrained vectored DSL lines together by selecting a candidate configuration for each; in which the selecting for the single-line constrained DSL lines is limited by dependent constraints of: the multi-line constrained bonded DSL lines, the multi-line constrained vectored DSL lines, and one or more others of the single-line constrained DSL lines; in which the selecting for the multi-line constrained bonded DSL lines is limited by dependent constraints of the single-line constrained DSL lines, the multi-line constrained vectored DSL lines, and one or more others of the multi-line constrained bonded DSL lines; and in which the selecting for the multi-line constrained vectored DSL lines is limited by dependent constraints of the single-line constrained DSL lines and the multi-line constrained bonded DSL lines, and one or more others of the multi-line constrained vectored DSL lines.

According to another embodiment of the method, the DSL system having the plurality of DSL lines operating therein including the currently operating DSL line, includes a group of DSL lines that are part of one of: (i) a same Digital Subscriber Line Access Multiplexer (DSLAM), (ii) a same common binder, (iii) a same DSL cable having a plurality of DSL lines therein, and (iv) a same neighborhood.

For instance, in such an embodiment, crosstalk between DSL lines within the group of DSL lines can negatively affect performance the DSL lines within the group of DSL lines, in which case the crosstalk could negatively affect performance the DSL lines within the group of DSL lines due to one of: (i) the group of DSL lines is not a vectored group of DSL lines, (ii) the crosstalk is only partially cancelled for the group of DSL lines which is a vectored group of DSL lines, and (iii) one or more of the DSL lines of the group of DSL lines are not part of a vectored group of DSL lines and the remaining of the DSL lines of the group of DSL lines belong to the vectored group of DSL lines.

According to another embodiment, the method further includes: managing the group of DSL lines in accordance with Dynamic spectrum management: Level 2 DSM ("DSM Level 2"); and wherein the selecting one of the sub-set of the plurality of candidate configurations as the selected configuration for the DSL line based on a preferred operational characteristic comprises: jointly selecting configurations for the DSL lines within the group of DSL lines based on power, Power Spectrum Density (PSD), and/or rates, wherein the DSL lines of the group of DSL lines are jointly managed to reduce the crosstalk which negatively affects performance the DSL lines within the group of DSL lines.

According to another embodiment of the method, the currently operating DSL line includes a bonded DSL line having therein at least a first single twisted-pair telephone line and a second single twisted-pair telephone line therein, each of the first and second twisted-pair telephone lines jointly carrying DSL signals of the currently operating DSL line; and in the method further includes eliminating any of the plurality of candidate configurations for the currently operating DSL line which requires a different latency for each of the first and the second twisted-pair telephone lines of the bonded DSL line.

According to another embodiment of the method, the currently operating DSL line includes a vectored DSL line being one of a plurality of vectored DSL lines within a vectored group of DSL lines jointly managed for noise cancellation among each of the plurality vectored DSL lines within the vectored group of DSL lines; defining a super-configuration for the vectored group of DSL lines, the super-configuration specifying a vector of configurations corresponding to the plurality of vectored DSL lines within the vectored group of DSL lines; and in which the method further includes eliminating any of the plurality of candidate configurations for the currently operating DSL line which conflicts with integration requirements of the respective candidate configuration into the super-configuration by replacing one of the vector of configurations corresponding to the currently operating DSL line with the respective candidate configuration.

According to another embodiment of the method, selecting one of the sub-set of the plurality of candidate configurations as the selected configuration for the DSL line based on a preferred operational characteristic includes selecting based on the selected configuration exhibiting one of: (i) greatest estimated data rate for the DSL line if transitioned to the selected configuration; (ii) greatest estimated stability for the DSL line if transitioned to the selected configuration; (iii) least estimated latency for the DSL line if transitioned to the selected configuration; (iv) least predicted call, dispatch or churn rates for the DSL line if transitioned to the selected configuration; (v) greatest estimated compliance to user specified Quality of Service (QoS) parameters for the DSL line if transitioned to the selected configuration; and (vi) a combination of one or more from (i) through (v).

According to another embodiment of the method, selecting one of the sub-set of the plurality of candidate configurations as the selected configuration for the DSL line based on a preferred operational characteristic, includes: determining that two or more of the sub-set of the plurality of candidate configurations exhibits an identical preferred operational characteristic; selecting one from the two or more of the sub-set of the plurality of candidate configurations which exhibit the identical preferred operational characteristic based on which of the two or more exhibit a secondary preferred operational characteristic; and in which the preferred operational characteristic is one of stability, data rate, bandwidth, latency, and compliance to user specified Quality of Service (QoS) parameters, and further in which the secondary preferred operational characteristic is different than the preferred operational characteristic.

For example, there may be instances where multiple of the surviving candidate configurations exhibit the same utility for a given operational characteristic specified as the preferred characteristic. Consider for example, where 100 candidate configurations are provided. It may be that, for example, 75 of these are eliminated. Then through the computation of expected utility for the surviving candidate configurations, it may be that data rate is specified as the preferred operational characteristic, but 10 of the remaining 25 candidate configurations result in the same expected utility. That is to say, 10 surviving candidate configurations will, or are expected to, result in the identical data rate, if the currently operating DSL line is transitioned to them. It is a simple matter to give preference to these 10 candidate configurations reflecting the best, but identical data rate, but then the problem becomes which of these final 10 should be selected. Notwithstanding such commonality as to the utility of the best exhibited data rate, there may further be secondary preferred operational characteristics specified to operate as a tie-breaker. Any number of such tiers may by utilized, as necessary, such that the algorithm may eventually narrow to one, single and individual candidate configuration, which is then the configuration that will be selected for transitioning operation of the currently operating DSL line. Where larger initial populations of candidate configurations exist, these sub-tiers (e.g., secondary preferred operational characteristics, third tier preferred operational characteristics, fourth, fifth, and so forth), may be necessary to operate as further objective narrowing criteria.

According to another embodiment of the method, transitioning the currently operating DSL line from operating using the active configuration for the DSL line to operating using the selected configuration for the DSL line, includes: sending instructions to a DSL modem communicatively interfaced with the currently operating DSL line, in which the instructions specify the selected configuration and commands necessary to transition operation of the DSL modem to the selected configuration.

According to another embodiment, the method further includes: evaluating the DSL line operating using the selected configuration; optimizing the DSL line by iteratively repeating the determining, selecting, and transitioning operations; exiting the optimizing by terminating the iteratively repeating the determining, selecting, and transitioning operations after convergence; and in which convergence is achieved according to at least one of: (i) the active configuration of the currently operating DSL line is determined as being a best possible configuration among the active configuration and the plurality of candidate configurations for the currently operating DSL line for a predetermined period of time, and (ii) the active configuration of the currently operating DSL line is determined as being a best possible configuration among the active configuration and the plurality of candidate configurations for the currently operating DSL line greater than a predetermined quantity of iterations of optimizing for the currently operating DSL line, and (iii) the optimizing exceeds a pre-determined time threshold allowed for performing the optimizing on any given DSL line among the plurality of DSL lines in the DSL system.

For example, the predetermined period of time may be in hours, days, weeks, etc., and if the active configuration is maintained as the preferred configuration for that period of time, then optimization should end due to convergence having been achieved. Additionally, if the active configuration is repeatedly maintained or selected as the best configuration through numerous iterations, then after a predetermined quantity of iterations, the active configuration will be identified as the best configuration attainable, and as such, optimization should end due to convergence having been achieved. Further still, if the period of optimization is exceeded according to a predetermined time threshold, regardless of the result, then once again optimization should end due to convergence having been achieved to the best extent possible for the time period allowed. For example, it may be determined that any optimization efforts past a week, or a month, or a set number of days, are futile, and thus, optimization could be exited pursuant to the passage of time, rather than some other affirmative event.

According to another embodiment, the method further includes: determining the currently operating DSL line is subject to multi-line constraints due to operating as a bonded DSL line or as a vectored DSL line; in which determining a plurality of candidate configurations includes constructing the candidate configurations from a repository of multi-line candidate configurations; in which the method further includes eliminating one or more of the plurality of candidate configurations by filtering the repository of multi-line candidate configurations according to multi-line constraints for the bonded or vectored DSL line; in which the method further includes generating a list of configuration tuples from the remaining plurality of candidate configurations; in which selecting one of the sub-set of the plurality of candidate configurations as the selected configuration for the DSL line based on a preferred operational characteristic includes identifying the configuration tuple which maximizes the preferred operational characteristic; and in which transitioning the currently operating DSL line from operating using the active configuration for the DSL line to operating using the selected configuration for the DSL line includes sending instructions for the currently operating DSL line to adopt the identified configuration tuple which maximizes the preferred operational characteristic.

According to another embodiment, the method further includes: determining the currently operating DSL line is subject to single DSL line constraints; in which determining a plurality of candidate configurations includes constructing the candidate configurations from a repository of single-line candidate configurations; in which the method further includes eliminating one or more of the plurality of candidate configurations by filtering the repository of single-line candidate configurations according to single-line constraints for the currently operating DSL line; in which the method further includes generating a list of configuration tuples from the remaining plurality of candidate configurations; in which selecting one of the sub-set of the plurality of candidate configurations as the selected configuration for the DSL line based on a preferred operational characteristic includes identifying the configuration tuple which maximizes the preferred operational characteristic; and in which transitioning the currently operating DSL line from operating using the active configuration for the DSL line to operating using the selected configuration for the DSL line includes sending instructions for the currently operating DSL line to adopt the identified configuration tuple which maximizes the preferred operational characteristic.

According to another embodiment, the method further includes eliminating one or more of the plurality of candidate configurations by filtering a repository of candidate configurations according to DSL line transition constraints for the currently operating DSL line; and in which the DSL line transition constraints specify a maximum threshold change allowable for any one of a plurality of operational characteristics associated with the currently operating DSL line, in which any of the candidate configurations requiring a change to an operational characteristic associated with the currently operating DSL line in excess of the maximum threshold change allowable is eliminated from further consideration.

For example, from a practical standpoint of implementing state transition for the DSL line between candidate configurations, it is necessary to avoid drastic changes to the profile parameters as this could cause instability and potential downtime for the currently operating DSL line, or worse, exhibit undue levels of interference, crosstalk, noise, etc., for other lines located physically near the path of the currently operating DSL line, in which such interference, etc., could cause instability or downtime for those other lines which in turn may cause service calls and increase operational costs for the DSL operator responsible for those other DSL lines. Drastic changes may, for example, trigger re-train events for a DSL modem which will be perceived by the user as downtime of the DSL service during which time the DSL modem re-initializes and attempts to resume service, potentially at worse operational levels than were in effect before the attempted state transition, or such drastic changes in the context of vectoring could cause a significant enough of a change that vectoring coefficients fail to adaptively accommodate the change which could then trigger the vectoring engine to attempt re-initialization of its vectoring coefficients, which in a worst case scenario, could temporarily disable many DSL lines of other users associated with such an affected vectored group, and then again triggering a wave of service calls from affected DSL customers.

According to another embodiment, the method further includes: determining the currently operating DSL line is subject to single DSL line constraints; and in which the method further includes eliminating one or more of the plurality of candidate configurations by: running individual configuration evaluation algorithms in parallel for the plurality of candidate configurations, and eliminating any candidate configuration failing a legacy feasibility test which assesses whether the respective candidate configuration will operate in compliance with one or more sub-rules.

For example, the one or more sub-rules may be written based upon performance or operational counters collected from the interfaced DSL lines in the field, for example, of the DSL lines undergoing optimization. One way that such sub-rules may be expressed is as follows: "function(CV, retrains, G.INP counters, rate, FEC, margin) <=or=>threshold." Thus, an example may be, for example, sub-rule (a) "98th percentile of measured downstream CV at 10 Mbps sync rate for current profile<=1000" or sub-rule (b) "average estimated downstream rate for target profile>=20 Mbps," and so forth.

According to another embodiment, the method further includes: generating utility values for each of the candidate configurations which are not eliminated, the utility values representing operational characteristics for the respective candidate configurations; applying weighting values to the utility values based on whether the operational characteristics correspond to the preferred operational characteristic; and outputting a list of the scores corresponding to the candidate configurations.

According to another embodiment of the method, higher weighting values are applied to the utility values for operational characteristics corresponding to the preferred operational characteristic and in which lesser weighting values are applied to the utility values for operational characteristics corresponding to one or more secondary preferred operational characteristics.

According to another embodiment of the method, selecting one of the sub-set of the plurality of candidate configurations as the selected configuration for the DSL line based on a preferred operational characteristic, includes: calculating a probability that a service call, service dispatch, and service churn will be initiated by transitioning the currently operating DSL line to each respective one of the sub-set of the plurality of candidate configurations; and selecting the one of the sub-set of the plurality of candidate configurations which minimizes the probability that the service call, service dispatch, and service churn will be initiated by transitioning the currently operating DSL line.

For example, service calls occur when a DSL subscriber calls the DSL service provider or DSL operator to request technical assistance for a perceived problem with the DSL subscriber's service. A service dispatch occurs when a technician for the DSL service provider or DSL operator is sent to the location of the DSL service subscriber to assess a problem in an attempt to resolve a pending problem, issue, or deficiency with the DSL service to the DSL subscriber. Service churn results when a DSL subscriber cancels their DSL service, which may occur for many reasons, but is greatly influenced by the DSL service subscribers' satisfaction with the service, including stability and frequency of outages, etc.

According to another embodiment of the method, selecting one of the sub-set of the plurality of candidate configurations as the selected configuration for the DSL line based on a preferred operational characteristic, includes: determining a minimum data rate specified according to a DSL subscriber's paid subscription plan; and selecting the one of the sub-set of the plurality of candidate configurations which minimizes the probability of customer dissatisfaction by operating the DSL line for the DSL subscriber at a data rate less than the minimum data rate specified according to a DSL subscriber's paid subscription plan.

According to another embodiment, the method further includes: generating estimated operational characteristics for each of the plurality of candidate configurations relative to the currently operating DSL line if transitioned to the respective candidate configuration; and in which the estimated operational characteristics are based on the operational data collected for the currently operating DSL line and based further on configuration settings within each of the plurality of candidate configurations.

According to another embodiment of the method, the estimated operational characteristics are based further on stored historical operational data for the currently operating DSL line when the currently operating DSL line operated using one or more configurations different than the active configuration.

According to another embodiment, the method further includes: scoring each of the sub-set of the plurality of candidate configurations based on adherence to the preferred operational characteristic and based further upon one or more secondary preferred operational characteristics; and in which selecting one of the sub-set of the plurality of candidate configurations as the selected configuration for the DSL line based on a preferred operational characteristic includes selecting the one of the sub-set of the plurality of candidate configurations having the highest score.

According to another embodiment, the method is implemented via one of: a chipset of a Customer Premises Equipment (CPE) modem communicably interfaced with a first end of the currently operating DSL line; a chipset of a signal conditioning device physically separate and distinct from a Customer Premises Equipment (CPE) modem, wherein the CPE modem is communicably interfaced with the first end of the currently operating DSL line and wherein the signal conditioning device is communicatively interfaced to the CPE modem; a controller card configured within a Customer Premises Equipment (CPE) modem communicably interfaced with the first end of the currently operating DSL line; and a controller card configured within a signal conditioning device physically separate and distinct from a Customer Premises Equipment (CPE) modem, wherein the CPE modem is communicably interfaced with the first end of the currently operating DSL line and wherein the signal conditioning device is communicatively interfaced to the CPE modem.

There is according to another embodiment, a non-transitory computer readable storage medium having instructions stored thereon that, when executed by a processor in a configuration optimizer, the instructions cause the configuration optimizer to perform operations including: interfacing to a currently operating Digital Subscriber Line ("DSL line") operating within a DSL system having a plurality of DSL lines operating therein; evaluating an active configuration of the currently operating DSL line by collecting operational data for the DSL line during operation of the DSL line; determining a plurality of candidate configurations for the currently operating DSL line, the plurality of candidate configurations being operationally compatible with the currently operating DSL line; selecting one of the sub-set of the plurality of candidate configurations as the selected configuration for the DSL line based on a preferred operational characteristic; and transitioning the currently operating DSL line from operating using the active configuration for the DSL line to operating using the selected configuration for the DSL line.

Figure 5:
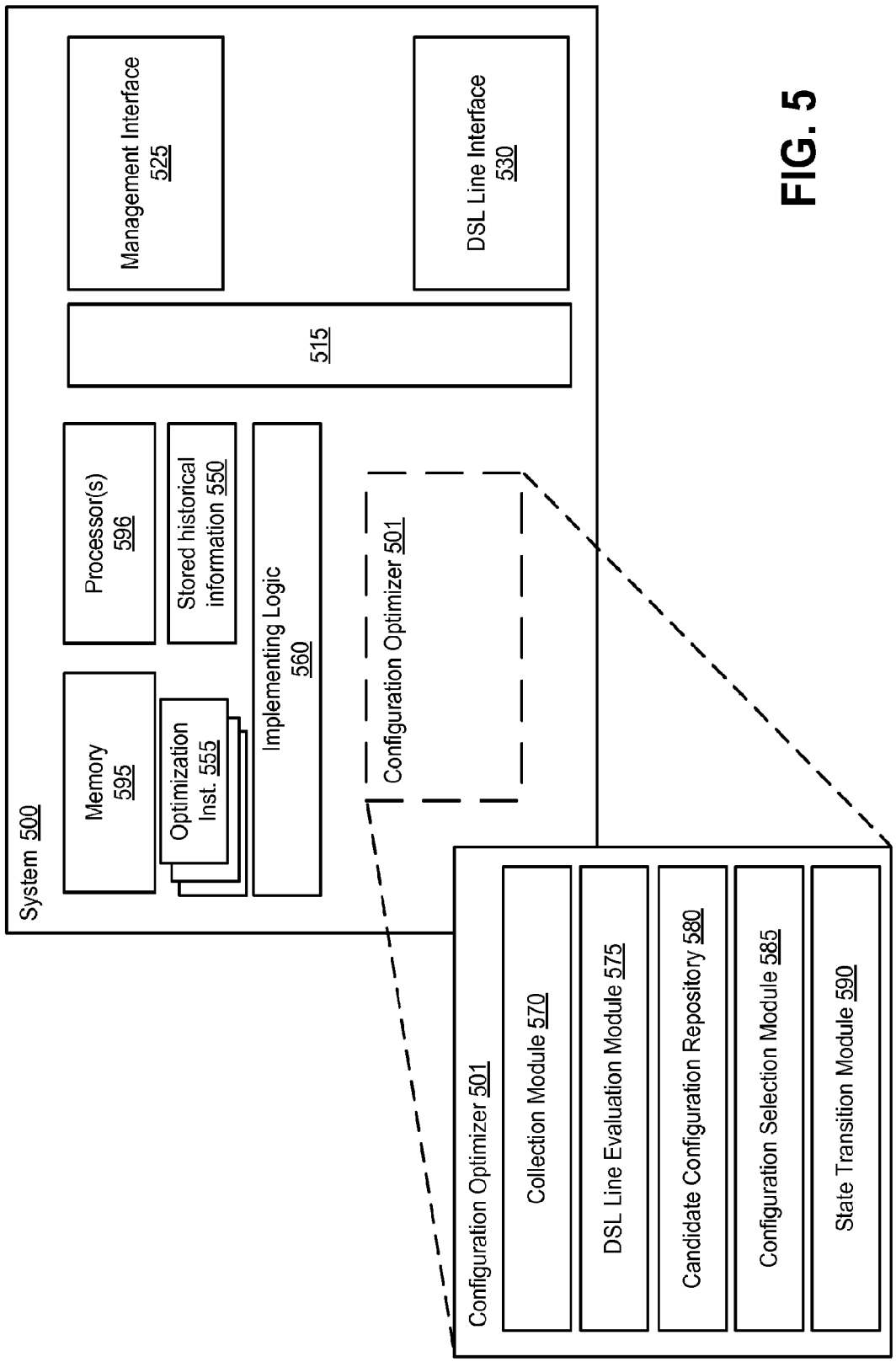
FIG. 5 shows a diagrammatic representation of a system having a configuration optimizer optionally configured therein in accordance with which embodiments may operate.

FIG. 5 shows a diagrammatic representation of a system 500 having a configuration optimizer 501 optionally configured therein in accordance with which embodiments may operate.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes management interface 525, for example, to retrieve information, receive requests, return responses, and otherwise interface with network elements located separately from system 500.

In some embodiments, management interface 525 communicates information via an out-of-band connection separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the system 500 and other networked devices or between the system 500 and a third party service provider.

System 500 further includes DSL line interface 530 to communicate information via a communicatively interfaced DSL connection or to monitor connected DSL lines, DSL loops, DSL twisted pairs, and Digital communication lines which are interfaced to system 500. System 500 further includes stored historical information 550 that may be analyzed or referenced when conducting longer term analysis for a DSL line. System 500 may further include multiple optimization instructions 555, any of which may be initiated responsive to analysis of the DSL lines undergoing configuration optimization, including single and multi constrained lines, such as individual DSL lines, bonded DSL lines and vectored DSL lines.

Distinct within system 500 is configuration optimizer 501 which includes collection module 570, DSL Line Evaluation Module 575, Candidate Configuration Repository 580, Configuration Selection Module 585, and State Transition Module 590. The configuration optimizer 501 may be installed and configured in a compatible system 500 as is depicted by FIG. 5, or provided separately so as to operate in conjunction with appropriate implementing logic 560 or other software. The configuration optimizer 501 may be located in any of the previously described locations of configuration optimizer at element 170 of FIG. 1, for example, within a LAN, external to the LAN, at the CO, at the CPE premises, within a CPE modem, router, etc.

Thus, it is in accordance with one embodiment that a system 500 having a processor 596 and memory 595 therein includes a Digital Subscriber Line interface ("DSL line interface") 530 to connect with a currently operating DSL line and a configuration optimizer 501 to operate in accordance with the previously described embodiments.

According to one such embodiment, the configuration optimizer 501 of such a system 500 includes: a DSL line evaluation module 575 to evaluate an active configuration of the currently operating DSL line by collecting, via collection module 570, operational data for the DSL line during operation of the DSL line; a candidate configuration repository 5780 having stored therein a plurality of candidate configurations for the currently operating DSL line, the plurality of candidate configurations being operationally compatible with the currently operating DSL line; a configuration selection module 585 to select one of the sub-set of the plurality of candidate configurations as the selected configuration for the DSL line based on a preferred operational characteristic; and a state transition module 590 to transition the currently operating DSL line from operating using the active configuration for the DSL line to operating using the selected configuration for the DSL line.

According to another embodiment, the system 500 operates within a third party entity physically separate from a Central Office (CO) associated with a DSL operator responsible for a DSL system having the currently operating DSL line operating therein; and in which the system communicatively interfaces with the currently operating DSL line over a public Internet via a Digital Subscriber Line Access Multiplexer (DSLAM) coupled with a Customer Premises Equipment (CPE) modem for the currently operating DSL line.

According to another embodiment, the configuration optimizer 501 of the system 500 is embodied within one of: a chipset of a Customer Premises Equipment (CPE) at a business or residence of a DSL subscriber associated with the currently operating DSL line and communicatively interfaced to the first end of the currently operating DSL line; a chipset of a signal conditioning device physically separate and distinct from a CPE modem, in which the signal conditioning device is communicably interfaced with the first end of the currently operating DSL line and in which the CPE modem is communicatively interfaced to the signal conditioning device; a controller card configured within a CPE modem communicably interfaced with the first end of the currently operating DSL line; and a controller card configured within a signal conditioning device physically separate and distinct from a CPE modem, in which the signal conditioning device is communicably interfaced with the first end of the currently operating DSL line and in which the CPE modem is communicatively interfaced to the signal conditioning device.

According to another embodiment, the system 500 operates as a server of a cloud service provider physically remote from a Customer Premises Equipment (CPE) modem at a business or residence of a DSL subscriber associated with the currently operating DSL line; and in which the state transition module to transition the currently operating DSL line from operating using the active configuration for the DSL line to operating using the selected configuration for the DSL line includes the cloud service provider to issue optimization instructions to the CPE modem over a public Internet, the optimization instructions including at least the selected configuration and commands necessary to trigger activation of the selected configuration as a new active configuration at the CPE modem.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618, which communicate with each other via a bus 630. Main memory 604 and its sub-elements (e.g. 622, 623 and 624) are operable in conjunction with processing logic 626 and processor 602 to perform the methodologies discussed herein.

For example, main memory 604 includes collected data and calculations 624 which may include collected and current operational data regarding a currently operating DSL line, historical operational data regarding the currently operating DSL line, or various calculations and probabilities, such as expected utility metrics, computed probabilities of triggering various service calls, dispatch, churn, and so forth. Optimization instructions 623 include commands to initiate a state transition of a DSL modem to a specified set of parameters, settings, or selected configuration yielded from the configuration optimization process.

Configuration optimizer 634 implements the various methodologies described above, such as the collection of operational data, determining candidate configurations, filtering and elimination of candidate configurations, and final selection of the one single configuration to be utilized for a state transition of a DSL line pursuant to the configuration optimization process.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
    interfacing to a currently operating Digital Subscriber Line ("DSL line") operating within a DSL system having a plurality of DSL lines operating therein;
    evaluating an active configuration of the currently operating DSL line by collecting operational data for the DSL line during operation of the DSL line;
    determining a plurality of candidate configurations for the currently operating DSL line, the plurality of candidate configurations being operationally compatible with the currently operating DSL line; wherein determining the plurality of candidate configurations for the currently operating DSL line, comprises:
        retrieving successful configurations for one or more other DSL lines operating within the DSL system not including the currently operating DSL line, wherein the successful configurations have been identified as a selected configuration for at least one of the one or more other DSL lines in the DSL system and further in which the one or more other DSL lines in the DSL system have been transitioned to a respective one of the successful configurations; and
        including the successful configurations with the plurality of candidate configurations determined for the currently operating DSL line;
    selecting one of the sub-set of the plurality of candidate configurations as the selected configuration for the DSL line based on a preferred operational characteristic; and
    transitioning the currently operating DSL line from operating using the active configuration for the DSL line to operating using the selected configuration for the DSL line.

2. The method of claim 1, further comprising:
    evaluating the DSL line operating using the selected configuration; and
    repeating the determining, selecting, and transitioning.

3. The method of claim 1, wherein selecting one of the sub-set of the plurality of candidate configurations as the selected configuration for the DSL line based on a preferred operational characteristic, comprises:
    (i) for each of the plurality of candidate configurations, establishing an expected utility metric of the currently operating DSL line if transitioned to operation on the respective candidate configuration; and
    (ii) selecting the one of the sub-set of the plurality of candidate configurations, wherein the selecting is based on which of the plurality of candidate configurations corresponds to the expected utility metric having the highest value among all of the sub-set of the plurality of candidate configurations.

4. The method of claim 1:
wherein the active configuration of the currently operating DSL line is included as one of the plurality of candidate configurations; and
wherein selecting one of the sub-set of the plurality of candidate configurations as the selected configuration for the DSL line based on a preferred operational characteristic, comprises:
  (i) for each of the plurality of candidate configurations, establishing an expected utility metric of the currently operating DSL line if transitioned to operation on the respective candidate configuration, wherein the expected utility metric is based on the operational date collected for the DSL line during operation of the DSL line and based further on historical operational data previously collected and stored reflecting past operational characteristics of the DSL line, and
  (ii) selecting the one of the sub-set of the plurality of candidate configurations, wherein the selecting is based on which of the plurality of candidate configurations corresponds to the expected utility metric having the highest value among all of the sub-set of the plurality of candidate configurations.

5. The method of claim 1, further comprising:
eliminating one or more of the plurality of candidate configurations due to minimum operational requirements for the currently operating DSL line to yield a sub-set of the plurality of candidate configurations for the DSL line.

6. The method of claim 5, wherein eliminating one or more of the plurality of candidate configurations comprises:
  (i) retrieving user provided configuration constraints;
  (ii) establishing an expected utility metric of the currently operating DSL line if transitioned to operation on a first one of the plurality of candidate configurations;
  (iii) comparing the expected utility metric to the user provided configuration constraints;
  (iv) eliminating the first one of the plurality of candidate configurations when the expected utility metric indicates the user provided configuration constraints will not be achieved if the currently operating DSL line is transitioned to the first one of the plurality of candidate configurations; and
  (v) iterating through each of the remaining plurality of candidate configurations by repeating operations (ii) through (iv).

7. The method of claim 1, wherein determining the plurality of candidate configurations for the currently operating DSL line, comprises:
interfacing to a Digital Subscriber Line Access Multiplexer (DSLAM) communicatively interfaced with the currently operating DSL line;
reading available candidate configurations for the currently operating DSL line from the DSLAM; and
including the available candidate configurations read from the DSLAM with the plurality of candidate configurations determined for the currently operating DSL line.

8. The method of claim 1, wherein determining the plurality of candidate configurations for the currently operating DSL line, comprises:
generating multiple copies of the active configuration for the currently operating DSL line or multiple copies of a default configuration, or both;
modifying at least one configuration setting within each of the multiple copies to yield multiple unique variations of the active configuration or the default configuration, or both, each of the multiple unique variations being distinct from one another, distinct from the active configuration, and distinct from the default configuration; and
including the multiple unique variations with the plurality of candidate configurations determined for the currently operating DSL line.

9. The method of claim 1, wherein the plurality of candidate configurations being operationally compatible with the currently operating DSL line, comprises:
  (i) each of the plurality of candidate configurations being capable of activation for the currently operating DSL line by transitioning a DSL modem for the currently operating DSL line to the respective candidate configuration;
  (ii) each of the plurality of candidate configurations having a plurality of configuration settings being wholly supported by the DSL modem for the currently operating DSL line;
  (iii) each of the plurality of candidate configurations having configuration settings therein, each of the configuration settings being within acceptable ranges or limits as specified by a DSL service provider; and
  (iv) each of the plurality of candidate configurations being compatible with bonded DSL line requirements when the currently operating DSL line is a bonded DSL line and further being compatible with vectored DSL line requirements when the currently operating DSL line is a vectored DSL line.

10. The method of claim 1, wherein the currently operating DSL line comprises one of:
a single twisted-pair telephone line carrying DSL signals of the currently operating DSL line to a single DSL service subscriber;
a bonded DSL line having two or more single twisted-pair telephone lines therein jointly carrying the DSL signals of the currently operating DSL line to the single DSL service subscriber; and
a vectored DSL line being one of a plurality vectored DSL lines within a vectored group of DSL lines jointly managed for noise cancellation among each of the plurality vectored DSL lines within the vectored group of DSL lines, the vectored DSL line carrying the DSL signals of the currently operating DSL line to the single DSL service subscriber and the remaining ones of the plurality vectored DSL lines within the vectored group of DSL lines carrying other DSL signals to other DSL service subscribers.

11. The method of claim 1:
wherein the DSL system having the plurality of DSL lines operating therein including the currently operating DSL line, includes single-line constrained DSL lines, multi-line constrained bonded DSL lines, and multi-line constrained vectored DSL lines;
wherein selecting one of the sub-set of the plurality of candidate configurations as the selected configuration for the DSL line based on the preferred operational characteristic comprises jointly optimizing the single-line constrained DSL lines, the multi-line constrained bonded DSL lines, and the multi-line constrained vectored DSL lines together by selecting a candidate configuration for each;
wherein the selecting for the single-line constrained DSL lines is limited by dependent constraints of: the multi-line constrained bonded DSL lines, the multi-line constrained vectored DSL lines, and one or more others of the single-line constrained DSL lines;

wherein the selecting for the multi-line constrained bonded DSL lines is limited by dependent constraints of the single-line constrained DSL lines, the multi-line constrained vectored DSL lines, and one or more others of the multi-line constrained bonded DSL lines; and wherein the selecting for the multi-line constrained vectored DSL lines is limited by dependent constraints of the single-line constrained DSL lines and the multi-line constrained bonded DSL lines, and one or more others of the multi-line constrained vectored DSL lines.

12. The method of claim 1:

wherein the DSL system having the plurality of DSL lines operating therein including the currently operating DSL line, includes a group of DSL lines that are part of one of:

(i) a same Digital Subscriber Line Access Multiplexer (DSLAM);

(ii) a same common binder;

(iii) a same DSL cable having a plurality of DSL lines therein; and (iv) a same neighborhood.

13. The method of claim 12, further comprising:

managing the group of DSL lines in accordance with Dynamic spectrum management: Level 2 DSM ("DSM Level 2"); and wherein the selecting one of the sub-set of the plurality of candidate configurations as the selected configuration for the DSL line based on a preferred operational characteristic comprises:

jointly selecting configurations for the DSL lines within the group of DSL lines based on power, Power Spectrum Density (PSD), and/or rates, wherein the DSL lines of the group of DSL lines are jointly managed to reduce the crosstalk which negatively affects performance the DSL lines within the group of DSL lines.

14. The method of claim 1:

wherein the currently operating DSL line comprises a bonded DSL line having therein at least a first single twisted-pair telephone line and a second single twisted-pair telephone line therein, each of the first and second twisted-pair telephone lines jointly carrying DSL signals of the currently operating DSL line; and wherein the method further comprises eliminating any of the plurality of candidate configurations for the currently operating DSL line which requires a different latency for each of the first and the second twisted-pair telephone lines of the bonded DSL line.

15. The method of claim 1:

wherein the currently operating DSL line comprises a vectored DSL line being one of a plurality of vectored DSL lines within a vectored group of DSL lines jointly managed for noise cancellation among each of the plurality vectored DSL lines within the vectored group of DSL lines;

defining a super-configuration for the vectored group of DSL lines, the super-configuration specifying a vector of configurations corresponding to the plurality of vectored DSL lines within the vectored group of DSL lines; and wherein the method further comprises eliminating any of the plurality of candidate configurations for the currently operating DSL line which conflicts with integration requirements of the respective candidate configuration into the super-configuration by replacing one of the vector of configurations corresponding to the currently operating DSL line with the respective candidate configuration.

16. The method of claim 1, wherein selecting one of the sub-set of the plurality of candidate configurations as the selected configuration for the DSL line based on a preferred operational characteristic comprises selecting based on the selected configuration exhibiting one of:

(i) greatest estimated data rate for the DSL line if transitioned to the selected configuration;

(ii) greatest estimated stability for the DSL line if transitioned to the selected configuration;

(iii) least estimated latency for the DSL line if transitioned to the selected configuration;

(iv) least predicted call, dispatch or churn rates for the DSL line if transitioned to the selected configuration;

(v) greatest estimated compliance to user specified Quality of Service (QoS) parameters for the DSL line if transitioned to the selected configuration; and (vi) a combination of one or more from (i) through (v).

17. The method of claim 1, wherein selecting one of the sub-set of the plurality of candidate configurations as the selected configuration for the DSL line based on a preferred operational characteristic, comprises:

determining that two or more of the sub-set of the plurality of candidate configurations exhibits an identical preferred operational characteristic;

selecting one from the two or more of the sub-set of the plurality of candidate configurations which exhibit the identical preferred operational characteristic based on which of the two or more exhibit a secondary preferred operational characteristic; and wherein the preferred operational characteristic is one of stability, data rate, bandwidth, latency, and compliance to user specified Quality of Service (QoS) parameters, and further wherein the secondary preferred operational characteristic is different than the preferred operational characteristic.

18. The method of claim 1, wherein transitioning the currently operating DSL line from operating using the active configuration for the DSL line to operating using the selected configuration for the DSL line, comprises:

sending instructions to a DSL modem communicatively interfaced with the currently operating DSL line, wherein the instructions specify the selected configuration and commands necessary to transition operation of the DSL modem to the selected configuration.

19. The method of claim 1, further comprising:

evaluating the DSL line operating using the selected configuration;

optimizing the DSL line by iteratively repeating the determining, selecting, and transitioning operations;

exiting the optimizing by terminating the iteratively repeating the determining, selecting, and transitioning operations after convergence; and wherein convergence is achieved according to at least one of:

(i) the active configuration of the currently operating DSL line is determined as being a best possible configuration among the active configuration and the plurality of candidate configurations for the currently operating DSL line for a predetermined period of time, and (ii) the active configuration of the currently operating DSL line is determined as being a best possible configuration among the active configuration and the plurality of candidate configurations for the currently operating DSL line greater than a predetermined quantity of iterations of optimizing for the currently operating DSL line, and (iii) the optimizing exceeds a pre-determined time threshold allowed for performing the optimizing on any given DSL line among the plurality of DSL lines in the DSL system.

20. The method of claim 1:
wherein the method further comprises determining the currently operating DSL line is subject to multi-line constraints due to operating as a bonded DSL line or as a vectored DSL line;
wherein determining a plurality of candidate configurations comprises constructing the candidate configurations from a repository of multi-line candidate configurations;
wherein the method further comprises eliminating one or more of the plurality of candidate configurations by filtering the repository of multi-line candidate configurations according to multi-line constraints for the bonded or vectored DSL line;
wherein the method further comprises generating a list of configuration tuples from the remaining plurality of candidate configurations;
wherein selecting one of the sub-set of the plurality of candidate configurations as the selected configuration for the DSL line based on a preferred operational characteristic comprises identifying the configuration tuple which maximizes the preferred operational characteristic; and
wherein transitioning the currently operating DSL line from operating using the active configuration for the DSL line to operating using the selected configuration for the DSL line comprises sending instructions for the currently operating DSL line to adopt the identified configuration tuple which maximizes the preferred operational characteristic.

21. The method of claim 1:
wherein the method further comprises determining the currently operating DSL line is subject to single DSL line constraints;
wherein determining a plurality of candidate configurations comprises constructing the candidate configurations from a repository of single-line candidate configurations;
wherein the method further comprises eliminating one or more of the plurality of candidate configurations by filtering the repository of single-line candidate configurations according to single-line constraints for the currently operating DSL line;
wherein the method further comprises generating a list of configuration tuples from the remaining plurality of candidate configurations;
wherein selecting one of the sub-set of the plurality of candidate configurations as the selected configuration for the DSL line based on a preferred operational characteristic comprises identifying the configuration tuple which maximizes the preferred operational characteristic; and
wherein transitioning the currently operating DSL line from operating using the active configuration for the DSL line to operating using the selected configuration for the DSL line comprises sending instructions for the currently operating DSL line to adopt the identified configuration tuple which maximizes the preferred operational characteristic.

22. The method of claim 1:
wherein the method further comprises eliminating one or more of the plurality of candidate configurations by filtering a repository of candidate configurations according to DSL line transition constraints for the currently operating DSL line; and
wherein the DSL line transition constraints specify a maximum threshold change allowable for any one of a plurality of operational characteristics associated with the currently operating DSL line, wherein any of the candidate configurations requiring a change to an operational characteristic associated with the currently operating DSL line in excess of the maximum threshold change allowable is eliminated from further consideration.

23. The method of claim 1:
wherein the method further comprises determining the currently operating DSL line is subject to single DSL line constraints; and
wherein the method further comprises eliminating one or more of the plurality of candidate configurations by:
running individual configuration evaluation algorithms in parallel for the plurality of candidate configurations, and
eliminating any candidate configuration failing a legacy feasibility test which assesses whether the respective candidate configuration will operate in compliance with one or more sub-rules.

24. The method of claim 23, further comprising:
generating utility values for each of the candidate configurations which are not eliminated, the utility values representing operational characteristics for the respective candidate configurations;
applying weighting values to the utility values based on whether the operational characteristics correspond to the preferred operational characteristic; and
outputting a list of the scores corresponding to the candidate configurations which are not eliminated.

25. The method of claim 24, wherein higher weighting values are applied to the utility values for operational characteristics corresponding to the preferred operational characteristic and wherein lesser weighting values are applied to the utility values for operational characteristics corresponding to one or more secondary preferred operational characteristics.

26. The method of claim 1, wherein selecting one of the sub-set of the plurality of candidate configurations as the selected configuration for the DSL line based on a preferred operational characteristic, comprises:
calculating a probability that a service call, service dispatch, and service churn will be initiated by transitioning the currently operating DSL line to each respective one of the sub-set of the plurality of candidate configurations; and
selecting the one of the sub-set of the plurality of candidate configurations which minimizes the probability that the service call, service dispatch, and service churn will be initiated by transitioning the currently operating DSL line.

27. The method of claim 1, wherein selecting one of the sub-set of the plurality of candidate configurations as the selected configuration for the DSL line based on a preferred operational characteristic, comprises:
determining a minimum data rate specified according to a DSL subscriber's paid subscription plan; and
selecting the one of the sub-set of the plurality of candidate configurations which minimizes the probability of customer dissatisfaction by operating the DSL line for the DSL subscriber at a data rate less than the minimum data rate specified according to a DSL subscriber's paid subscription plan.

28. The method of claim 1, further comprising:
generating estimated operational characteristics for each of the plurality of candidate configurations relative to the currently operating DSL line if transitioned to the respective candidate configuration; and
wherein the estimated operational characteristics are based on the operational data collected for the currently operating DSL line and based further on configuration settings within each of the plurality of candidate configurations.

29. The method of claim 25, wherein the estimated operational characteristics are based further on stored historical operational data for the currently operating DSL line when the currently operating DSL line operated using one or more configurations different than the active configuration.

30. The method of claim 1, further comprising:
scoring each of the sub-set of the plurality of candidate configurations based on adherence to the preferred operational characteristic and based further upon one or more secondary preferred operational characteristics; and
wherein selecting one of the sub-set of the plurality of candidate configurations as the selected configuration for the DSL line based on a preferred operational characteristic comprises selecting the one of the sub-set of the plurality of candidate configurations having the highest score.

31. The method of claim 1, wherein the method is implemented via one of:
a chipset of a Customer Premises Equipment (CPE) modem communicably interfaced with a first end of the currently operating DSL line;
a chipset of a signal conditioning device physically separate and distinct from a Customer Premises Equipment (CPE) modem, wherein the CPE modem is communicably interfaced with the first end of the currently operating DSL line and wherein the signal conditioning device is communicatively interfaced to the CPE modem;
a controller card configured within a Customer Premises Equipment (CPE) modem communicably interfaced with the first end of the currently operating DSL line; and
a controller card configured within a signal conditioning device physically separate and distinct from a Customer Premises Equipment (CPE) modem, wherein the CPE modem is communicably interfaced with the first end of the currently operating DSL line and wherein the signal conditioning device is communicatively interfaced to the CPE modem.

32. A non-transitory computer readable storage medium having instructions stored thereon that, when executed by a processor in a configuration optimizer, the instructions cause the configuration optimizer to perform operations including:
interfacing to a currently operating Digital Subscriber Line ("DSL line") operating within a DSL system having a plurality of DSL lines operating therein;
evaluating an active configuration of the currently operating DSL line by collecting operational data for the DSL line during operation of the DSL line;
determining a plurality of candidate configurations for the currently operating DSL line, the plurality of candidate configurations being operationally compatible with the currently operating DSL line; wherein determining the plurality of candidate configurations for the currently operating DSL line, comprises:
retrieving successful configurations for one or more other DSL lines operating within the DSL system not including the currently operating DSL line, wherein the successful configurations have been identified as a selected configuration for at least one of the one or more other DSL lines in the DSL system and further in which the one or more other DSL lines in the DSL system have been transitioned to a respective one of the successful configurations; and
including the successful configurations with the plurality of candidate configurations determined for the currently operating DSL line;
selecting one of the sub-set of the plurality of candidate configurations as the selected configuration for the DSL line based on a preferred operational characteristic; and
transitioning the currently operating DSL line from operating using the active configuration for the DSL line to operating using the selected configuration for the DSL line.

33. The non-transitory computer readable storage medium of claim 32, wherein selecting one of the sub-set of the plurality of candidate configurations as the selected configuration for the DSL line based on a preferred operational characteristic, comprises:
(i) for each of the plurality of candidate configurations, establishing an expected utility metric of the currently operating DSL line if transitioned to operation on the respective candidate configuration; and
(ii) selecting the one of the sub-set of the plurality of candidate configurations, wherein the selecting is based on which of the plurality of candidate configurations corresponds to the expected utility metric having the highest value among all of the sub-set of the plurality of candidate configurations.

34. The non-transitory computer readable storage medium of claim 32, wherein the operations further comprise eliminating one or more of the plurality of candidate configurations by:
(i) retrieving user provided configuration constraints;
(ii) establishing an expected utility metric of the currently operating DSL line if transitioned to operation on a first one of the plurality of candidate configurations;
(iii) comparing the expected utility metric to the user provided configuration constraints;
(iv) eliminating the first one of the plurality of candidate configurations when the expected utility metric indicates the user provided configuration constraints will not be achieved if the currently operating DSL line is transitioned to the first one of the plurality of candidate configurations; and
(v) iterating through each of the remaining plurality of candidate configurations by repeating operations (ii) through (iv).

35. A system comprising:
a processor and memory;
a Digital Subscriber Line interface ("DSL line interface") to connect with a currently operating DSL line; and
a configuration optimizer, wherein the configuration optimizer comprises:
a DSL line evaluation logic to evaluate an active configuration of the currently operating DSL line by collecting operational data for the DSL line during operation of the DSL line;
a candidate configuration repository having stored therein a plurality of candidate configurations for the currently operating DSL line, the plurality of candidate configurations being operationally compatible with the currently operating DSL line; wherein the plurality of candidate configurations, for the currently operating DSL line, are determined by:

retrieving successful configurations for one or more other DSL lines operating within the DSL system not including the currently operating DSL line, wherein the successful configurations have been identified as a selected configuration for at least one of the one or more other DSL lines in the DSL system and further in which the one or more other DSL lines in the DSL system have been transitioned to a respective one of the successful configurations; and including, in the candidate configuration repository, the successful configurations with the plurality of candidate configurations determined for the currently operating DSL line;

a configuration selection logic to further select one of the sub-set of the plurality of candidate configurations as the selected configuration for the DSL line based on a preferred operational characteristic; and a state transition logic to transition the currently operating DSL line from operating using the active configuration for the DSL line to operating using the selected configuration for the DSL line.

36. The system of claim 35:

wherein the system operates within a third party entity physically separate from a Central Office (CO) associated with a DSL operator responsible for a DSL system having the currently operating DSL line operating therein; and wherein the system communicatively interfaces with the currently operating DSL line over a public Internet via a Digital Subscriber Line Access Multiplexer (DSLAM) coupled with a Customer Premises Equipment (CPE) modem for the currently operating DSL line.

37. The system of claim 35, wherein the configuration optimizer of the system is embodied within one of:

a chipset of a Customer Premises Equipment (CPE) at a business or residence of a DSL subscriber associated with the currently operating DSL line and communicatively interfaced to the first end of the currently operating DSL line;

a chipset of a signal conditioning device physically separate and distinct from a CPE modem, wherein the signal conditioning device is communicably interfaced with the first end of the currently operating DSL line and wherein the CPE modem is communicatively interfaced to the signal conditioning device;

a controller card configured within a CPE modem communicably interfaced with the first end of the currently operating DSL line; and a controller card configured within a signal conditioning device physically separate and distinct from a CPE modem, wherein the signal conditioning device is communicably interfaced with the first end of the currently operating DSL line and wherein the CPE modem is communicatively interfaced to the signal conditioning device.

38. The system of claim 35:

wherein the system operates as a server of a cloud service provider physically remote from a Customer Premises Equipment (CPE) modem at a business or residence of a DSL subscriber associated with the currently operating DSL line; and wherein the state transition logic to transition the currently operating DSL line from operating using the active configuration for the DSL line to operating using the selected configuration for the DSL line comprises the cloud service provider to issue optimization instructions to the CPE modem over a public Internet, the optimization instructions including at least the selected configuration and commands necessary to trigger activation of the selected configuration as a new active configuration at the CPE modem.

* * * * *